Oct. 17, 1950    A. P. SVENSSON    2,526,433
MOUNT FOR CAMERA LENSES

Filed Feb. 5, 1948    3 Sheets-Sheet 1

INVENTOR.
Algot P. Svensson
BY Sniton + Sniton
ATTORNEYS.

Oct. 17, 1950  A. P. SVENSSON  2,526,433
MOUNT FOR CAMERA LENSES
Filed Feb. 5, 1948  3 Sheets-Sheet 2

INVENTOR.
Algot P. Svensson
BY Linton & Linton
ATTORNEYS.

INVENTOR.
Algot P. Svensson

Patented Oct. 17, 1950

2,526,433

UNITED STATES PATENT OFFICE 2,526,433

MOUNT FOR CAMERA LENSES

Algot Percy Svensson, Goteborg, Sweden, assignor to Fritz Victor Hasselblad, Goteborg, Sweden Application February 5, 1948, Serial No. 6,382
In Sweden February 25, 1944

Section 1, Public Law 690, August 8, 1946
Patent expires February 25, 1964

2 Claims. (Cl. 88—57)

The present invention relates to mounts for camera lenses of the kind in which a sleeve with the lens system, which lens sleeve is axially movable and provided with guiding means adapted to prevent said lens sleeve against rotational movement, is provided with external screw threads matching corresponding screw threads of a focusing ring which is rotatably mounted in a sleeve and by the rotation of which the lens sleeve is imparted an axial movement in order to set the lens system at the desired distance from the plane of the photographic film or plate.

Lens mounts of this kind hitherto known suffer from the disadvantage that when photographing objects at a short distance one has been compelled to insert intermediate auxiliary rings in order to increase the distance between the lens system and the plane of the film, which is troublesome and time-consuming. Furthermore, it is, as a rule, not possible to accommodate said intermediate rings so, that it does not arise as an interval between the shortest distance, at which the camera can be focused without an intermediate ring, and the greatest distance, at which the camera can be focused after insertion of an intermediate ring.

The invention has for its object to overcome this disadvantage, and the invention is broadly characterized in that the sleeve, in which the focusing ring is mounted, is axially slidable in a ring fixed to the front wall of the camera, and that means are provided for fixing said sleeve in two or more different sliding positions in order to increase the focusing range of the camera without need of auxiliary, intermediate rings.

It is convenient to choose the distance between the different sliding positions of the sleeve so as to correspond to the greatest axial movement that can be imparted the lens sleeve by rotating the focusing ring, so as to make it possible to focus the camera for any distance from the nearest possible one up to infinity.

Figure 1:
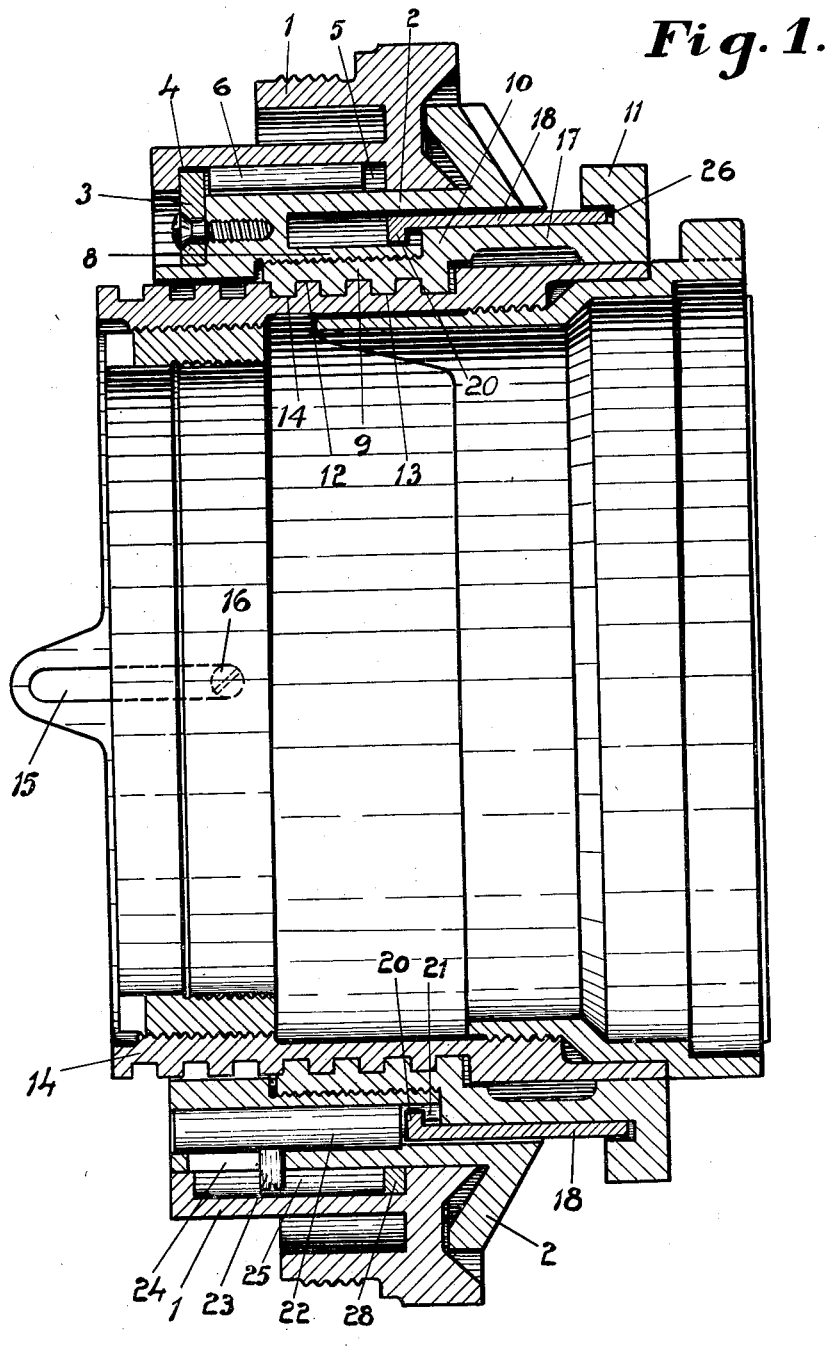
Figure 2:
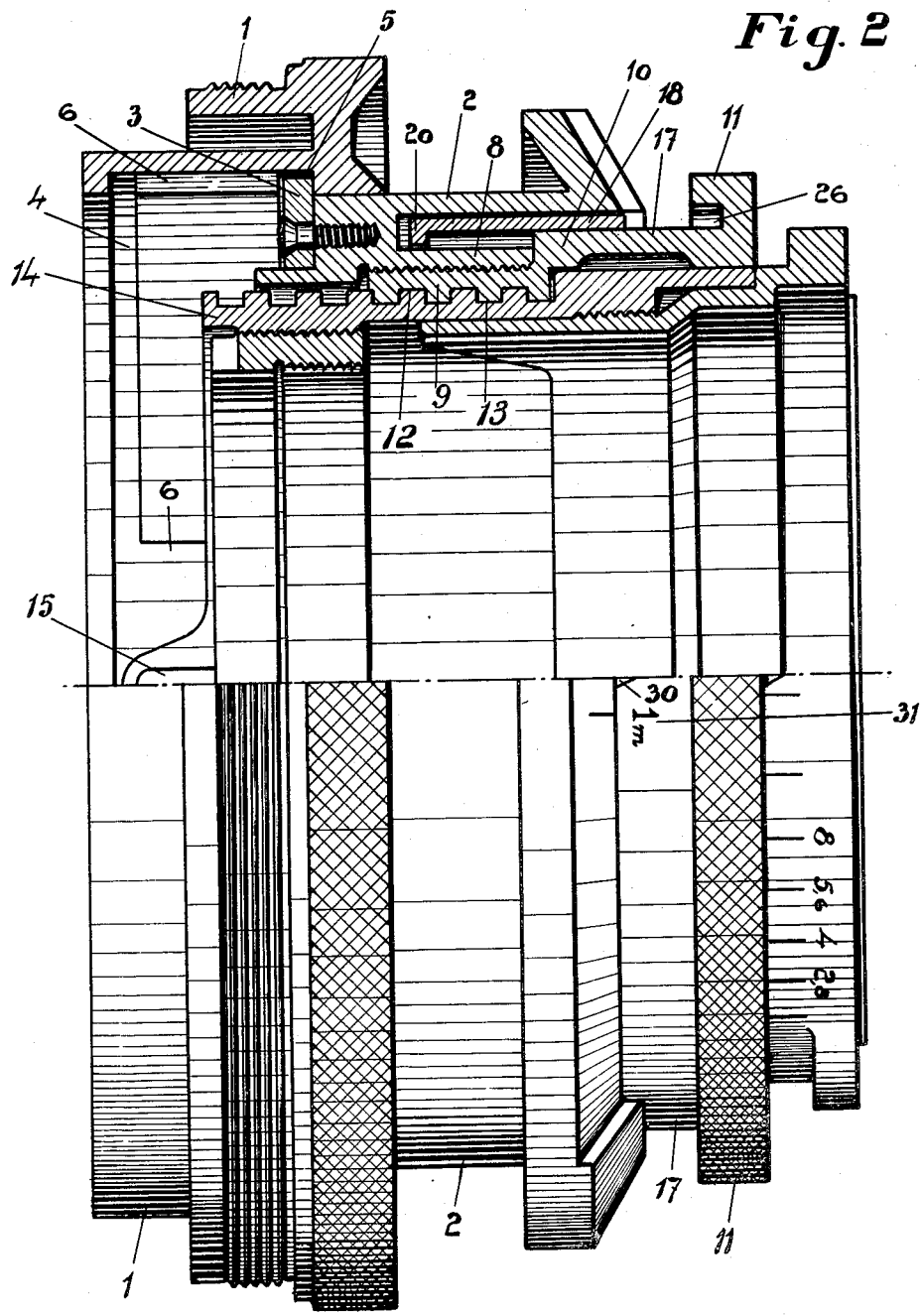
Figure 3:
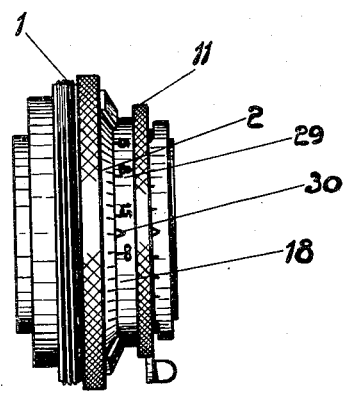
Figure 4:
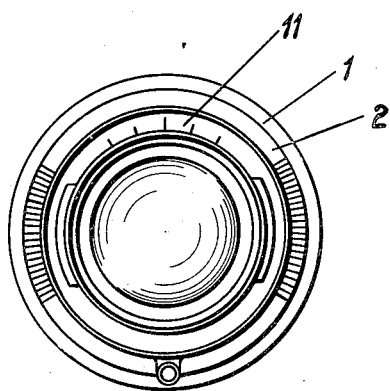

An embodiment of the invention is shown on the accompanying drawings, wherein Figure 1 is an axial section through a lens mount according to the invention and in position to be focused by means of the focusing ring from infinity to, for instance, about 1 meter, Figure 2 is a side view of the lens mount partly in section and in position to be focused by means of the focusing ring from 1 meter to, for instance, 30 or 40 centimeters, Figure 3 is a side view on a smaller scale of the lens mount in a sliding position corresponding to Figure 1, and Figure 4 a front view of the lens mount.

In the drawings 1 denotes a socket-shaped ring adapted to be fastened in an opening in the front wall (not shown) of the camera, and 2 a sleeve axially slidable in said ring. To the one end of the sleeve 2 there are fixed a number of radial projections 3 which rotating the sleeve 2 through a small angle can be brought into engagement with internal peripheral grooves 4 respectively 5 provided near each end of the ring 1. When sliding the sleeve 2 with respect to the ring 1 the projections pass along axial grooves 6 formed at the inside of the ring 1. A cylindrical portion 8 of the sleeve 2 is provided with internal screw threads of little pitch, and in said portion 8 there is rotatably mounted a cylindrical portion 9 of a sleeve-shaped ring 10, the last-mentioned portion 9 being provided with corresponding external screw threads. The ring 10 is at its one end projecting out of the sleeve 2 provided with a ring-shaped flange 11. The cylindrical portion 9 of the ring 10 is provided with internal screw threads 12 of a comparatively great pitch and in this cylindrical portions there is screwable a sleeve 14 provided with external screw threads 13. A lens system (not shown) is provided in said sleeve 14, said lens sleeve 14 being provided with two axial guiding slots 15 for two guiding studs 16 fixed to the sleeve 2 and preventing the lens sleeve 14 against rotational movement. It is obvious without further explanation that by rotating the ring 10 (the focusing ring) the lens sleeve 14 will be imparted an axial movement with respect to the focusing ring 10 and to the sleeve 2 in the one direction or the other. On a cylindrical end portion of the focusing ring 10 projecting out of the sleeve 2 there is slidably mounted a cylindrical sleeve 18 which by means of suitable guiding means (for instance a stud fixed to the sleeve and projecting through an axial slot in the ring portion 17) is prevented against rotational movement with respect to the focusing ring 10, in the rotational movement of which the sleeve 18 always participates. At its inner end the sleeve 18 is formed with an inwardly projecting flange 20 which is embraced by the hook-shaped end portion 21 of a number (suitably three) of pins 22 (only one is shown in the drawings) which are slidably mounted in holes formed in the wall of the sleeve 2. Each pin 22 has a radial projection 23 passing through a guiding slot 24 in the wall of the sleeve 2 into an internal recess 25 in the sleeve 2, said recess having a limited extension in axial direction. As the sleeve 2 occupies the position shown in Fig. 1, in which position it is temporarily fixed by turning it so that the projections 3 are brought into engagement with the grooves 4, the sleeve 18 is partly pushed out of the sleeve 2 so as to cover the cylindrical portion 17 of the focusing ring 10, whereby its end portion is received by an angular groove 26 in the flange 11. As the sleeve 2, after having been turned so as to disengage the projections 3 from the engagement with the grooves 4, is pulled out to the position shown in Figure 2, in which it can be fixed by turning it through a small angle so as to bring the projections 3 into engagement with the grooves 5, the sleeve 18 will at first follow the sleeve 2 in its axial displacement, but, as the projections 23 of the pins 22 contact abutments 28 (see Figure 1) provided at the one end of the recesses 25 in the ring 1, the pins 24 will at the further axial displacement of the sleeve 2 retain the sleeve 18, which so to say will be pulled into the sleeve 2 thereby discovering the cylindrical portion 17 of the focusing ring 10. When pushing the sleeve 2 back to the position shown in Figure 1 the sleeve 18 will be brought back to its position shown in the same figure.

The various parts of the lens mount described are so sized that in the position of the sleeve 2 shown in Figures 1 and 3 the lens system mounted in the lens sleeve 14 can by rotating the focusing ring 10 be focused within the normal focusing range, i. e. from infinity to about 1 meter. A normal focus scale 29 is provided on the sleeve 18 and adapted to cooperate with an index 30 provided at the front end of the sleeve 2. Furthermore, the axial distance between the grooves 4 and 5 is so chosen that in withdrawn position of the sleeve 2 (Figure 2) the lens system can by rotating the focusing ring 10 be focused within a close-up focusing range from about 1 meter down to, for instance, 30 centimeters. A close-up focus scale 31 is provided on the cylindrical portion 17 of the focusing ring 10 and adapted to cooperate with the above-mentioned index 30. According to the device described only that one of the scales is visible which corresponds to the focusing range chosen, so that the risk of confusion is avoided.

The invention is not limited to the embodiment described and shown on the accompanying drawings but may be varied in details without departing from the spirit of it. For instance, other means than the described can be provided for fixing the sleeve 2 in different sliding positions, and means can be provided for fixing the sleeve 2 in more than two different sliding positions.

What I claim is:

1. An improvement in mounts for camera lens comprising a sleeve for supporting a camera lens, a focusing ring rotatably mounted on and in threaded engagement with said sleeve for providing axial movement therebetween upon rotation of said ring, a second sleeve having said focusing ring rotatably mounted therein, a second ring capable of being mounted to the front wall of a camera and having said second sleeve axially slidable therein and means for limiting the sliding movement of said second sleeve to positions substantially equal to the maximum axial displacement of said first mentioned sleeve and focusing ring.

2. An improvement in mounts for camera lens comprising a sleeve for supporting a camera lens, a focusing ring rotatably mounted on and in threaded engagement with said sleeve for providing axial movement therebetween upon rotation of said ring, said ring having a normal focus scale indicia formed on the periphery thereof, a second sleeve having said focusing ring rotatably mounted therein, said second sleeve provided with an index adapted to cooperate with said focus scale, a third sleeve provided on its periphery with a close-up focus scale is axially slidable on said focusing ring and adapted to participate in the rotational movement of said ring, said third sleeve capable of being positioned for at times covering said normal focus scale through movement of said second sleeve and a second ring capable of being mounted to the front wall of a camera and having said second sleeve axially slidable therein.

ALGOT PERCY SVENSSON.

REFERENCES CITED

The following references are of record in the file of this patent:

UNITED STATES PATENTS

| Number | Name | Date |
|---|---|---|
| 1,076,694 | Oliver | Oct. 28, 1913 |
| 1,417,527 | Howell | May 30, 1922 |
| 1,620,727 | Howell | Mar. 15, 1927 |
| 2,011,359 | Gaty | Aug. 13, 1935 |
| 2,052,261 | Verschoor | Aug. 25, 1936 |
| 2,126,300 | Wittel | Aug. 9, 1938 |
| 2,263,024 | Wood | Nov. 18, 1941 |
| 2,362,603 | Wittel | Nov. 14, 1944 |

FOREIGN PATENTS

| Number | Country | Date |
|---|---|---|
| 119,252 | Sweden | May 14, 1947 |